April 22, 1930.  E. A. JOHNSTON ET AL  1,755,825
COTTON PICKER
Filed Nov. 15, 1926   2 Sheets-Sheet 2
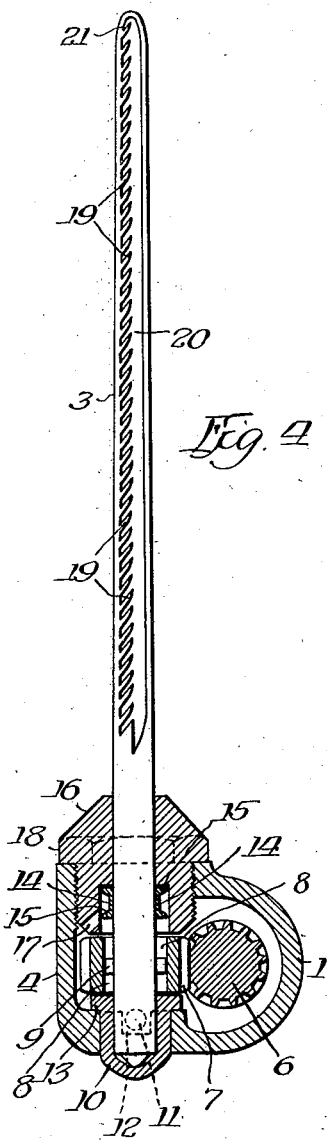
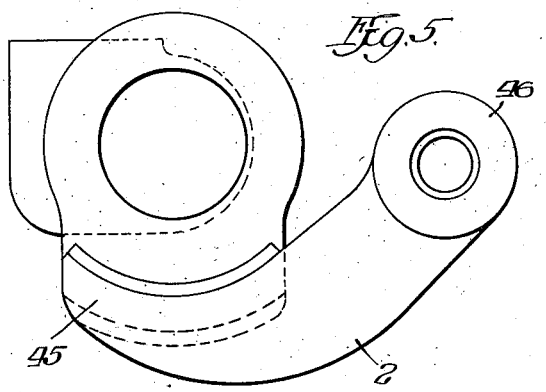
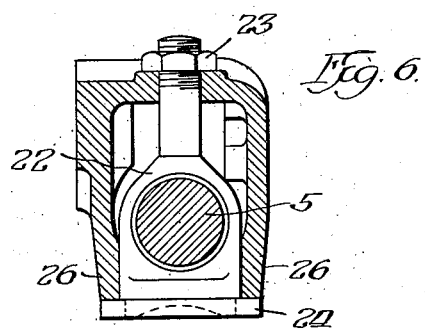
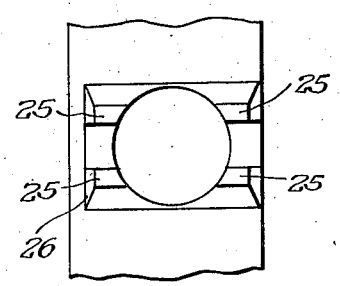
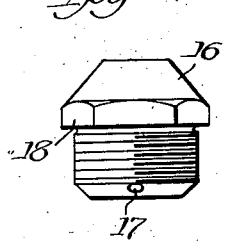
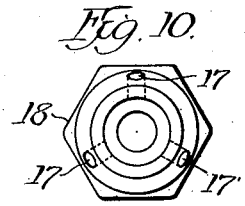
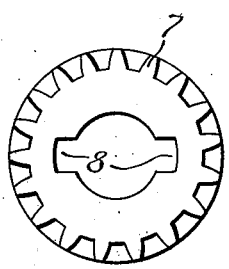
Inventors:
Edward A. Johnston,
David B. Baker, &
Clarence R. Hager Patented Apr. 22, 1930

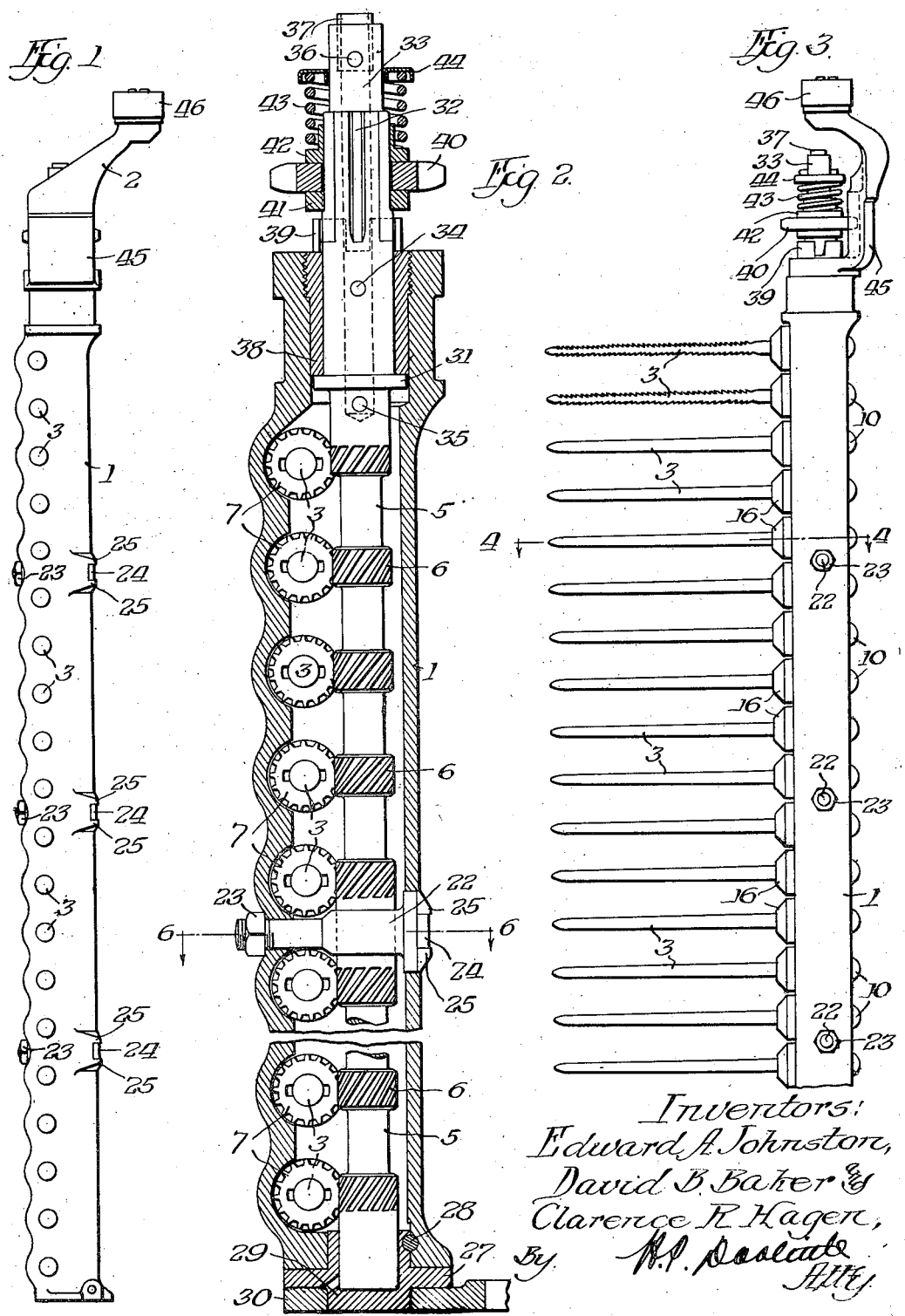

1,755,825

UNITED STATES PATENT OFFICE

EDWARD A. JOHNSTON, DAVID B. BAKER, AND CLARENCE R. HAGEN, OF CHICAGO, ILLINOIS, ASSIGNORS TO INTERNATIONAL HARVESTER COMPANY, OF CHICAGO, ILLINOIS, A CORPORATION OF NEW JERSEY

COTTON PICKER

Application filed November 15, 1926. Serial No. 148,555.

This invention relates to cotton harvesting machines and more particularly to an improved picker bar assembly which may be manufactured as a unit for use in that type of vehicle mounted cotton harvester wherein rotating picker stems are projected into the cotton plants as the vehicle progresses over a row of plants. In such a machine, the picker stems are carried in separate vertical series of picker bars which house mechanism for rotating the stems and are orbitally moved so as to cause the stems to project into the plants at an effective angle of approach, to remain within the plants long enough to gather all of the ripe cotton without injuring the unopened bolls, and to be withdrawn from the plants at such an angle that the cotton may be efficiently stripped from the stems.

It is an object of the invention to provide a successful picker bar which will be capable of uniformly accurate control of the movements of the picker stems as they are projected into and withdrawn from the plants.

It is also an object of the invention to provide a picker bar assembly of rugged construction capable of long continued and successful operation.

A further object of the invention is to provide an improved picker stem driving mechanism which permits adequate variation in the speed of rotation of the picker stems and allows release of driving connections in case abnormal resistance is encountered.

The construction by which the above objects are attained will be understood by reference to the accompanying drawings forming a part of the application, it being understood, however, that the description of the specific mechanism, though it constitutes a suitable and preferred means for carrying out the invention, is for the purpose of exemplification only and the invention is not limited thereto, but its scope is pointed out in the following claims.

Referring now to the drawings,—

Figure 1 is an elevation of the picker bar assembly taken from the side of the casing opposite from the side from which the picker stems extend;

Figure 2 is a vertical section through the gear casing of the picker stem assembly, showing the parts within the gear casing in elevation;

Figure 3 is a side elevation showing the manner in which the picker stems extend from the gear casing;

Figure 4 is a horizontal sectional view taken upon the line 4—4 of Figure 3 showing the picker stem in plan;

Figure 5 is a top plan view of the gear casing showing the relation of the integral cam arm thereto;

Figure 6 is a horizontal sectional view taken through the gear casing on the line 6—6 of Figure 2 and showing the bridge journal in plan;

Figure 7 is an elevation of a part of the gear casing for interlockingly receiving a head of one of the bridge journals;

Figure 8 is an elevation of one of the driven gears employed for removably receiving each picker stem;

Figure 9 is an elevation of the removable bushing which permits a picker stem to be detached from the gear casing; and Figure 10 is a bottom plan view of the bushing shown in Figure 9, showing the lubricating passages within the bushing.

The embodiment of the invention illustrated in the accompanying drawings is for use in connection with a cotton picker of the type shown in the patent to White No. 1,004,835, October 3, 1911, and is an improvement upon the picker bar assemblies which are illustrated in Figures 33 and 34 of the drawings of that patent. In this type of machine, a series of picker bar assemblies are caused to move in an orbital path so as to bring the rotating picker stems into and out of the cotton plants. As the picker bar assemblies are moved through such a path they are controlled by devices which cause the projecting picker stems to enter the plants at the appropriate angle and to leave the plants at a different angle so as to effectively cooperate with a stripping or doffing mechanism for removing the cotton which has been wound upon the picker stems.

In Figure 1 of the drawings there is shown a gear casing 1 preferably made of a single casting having an extension in the form of a cam arm 2, the latter controlling the various angles at which the picker stems project at different parts of the path of movement of the picker bar assembly. It is important that the cam arm 2 be rigid and immovable with relation to the gear casing 1, and it is also necessary that the picker bars of such machines be so constructed that they may be manufactured with uniform positioning of the cam arms 2 with relation to the gear casings. In the illustrative structure these results are obtained by making the cam arm 2 integral with the gear casing.

The gear casing 1 is shown of tubular form so as to rigidly support a plurality of superposed picker stems 3 and to adequately protect and house the gearing for rotating those picker stems. As is well illustrated in Figure 4 of the drawings, the gear casing is formed at intervals with projections 4 for rotatively housing the picker stems. These housings are barrel shaped with their longitudinal axes extending tangentially with relation to the driving shaft 5. The latter extends longitudinally through the gear casing, as clearly shown in Figure 2, and is rotatively journaled in the casing at its ends.

For supplying continuous rotary motion to the spindles 3, the driving shaft 5 is preferably formed at intervals with helical pinions 6, which, in this case, may be also termed driving gears. The arrangement by which each driving gear 6 rotates a spindle 3 is well illustrated in Figure 4 of the drawings. Each pinion 6 meshes with a driven gear or pinion 7 formed with radial slots 8 extending from its bore so as to slidably receive the ends of a key 9 fixedly mounted in the picker stem. The key 9 is preferably closely fitted in the radial slots 8 so as to maintain the driven gear 7 in proper operating position when the parts are assembled, as illustrated in Figure 4 of the drawings.

One end of each picker stem is rotatively journaled within a bushing 10 which is closely fitted into an opening in the casing 1, as is clearly shown in Figure 4. This bushing is preferably formed with a lubricating duct 11 communicating with a passageway 12 formed in the gear casing adjacent the opening for each of the bushings. The bushing 10 is also preferably formed with a flange 13 which operates to hold the bushing within the casing and to cooperate with a side face of the driven gear 7 so as to maintain the latter in accurate operating position.

Again referring to Figure 4 of the drawings, a sleeve 14 is shown mounted upon the picker stem 3 on the opposite side of the driven gear 7. This sleeve preferably has a drive fit with relation to the picker stem for the purpose of holding the picker stem in working position within the casing, and it is also formed with flanges 15, the purpose of which is to prevent the excessive gathering of lubricant around the picker stem. These flanges operate by centrifugal action to throw lubricant from the rotating picker stem.

The above described sleeve 14 also acts as a thrust ring inasmuch as it rotatively bears against the end of a bore within the removable bushing 16. The bushing 16 is preferably screw threaded within the casing 1, as shown in Figure 4, and is formed at its inner end with a plurality of lubricant conducting passages 17, as are clearly shown in Figures 4, 9 and 10 of the drawings. The inner end of the removable bushing 16 is arranged so as to be closely adjacent to the driven gear 7 for the purpose of appropriately confining said gear to its operative position. For the purpose of permitting the removal of the picker stems, the removable bushings 16 are formed with polygonal wrench receiving surfaces, as indicated at 18, (Figure 9).

The picker stems shown in Figure 4 of the drawings are formed with teeth 19. There are preferably two rows of such teeth upon each picker stem. Beneath the teeth of each row, the metal of the picker stem is preferably cut away, the substantially round stem thereby having the flattened portions 20. The particular structure of teeth shown enables the cotton to be adequately and effectively cleared from the picker stems by a doffing mechanism. The picker stems herein illustrated are adequately strengthened by the limiting of the tapered portion 21 to but a small part of the length of the picker stem near its tip, it having been found in practice that picker stems having a longer taper would be frequently broken by contact with the stalks and branches of the cotton plants.

The driving shaft 5 is centered and supported within the casing 1 by means of bridge journals or arbor bolts 22, which are well shown in Figures 2, 6 and 7. These arbor bolts extend transversely through the casing and are tightened in position by nuts 23. The head of the arbor bolt is preferably circular in form and is provided with diametrically opposite extensions 24 which are seated on the casing between the lugs 25 in order that the arbor bolt may be accurately seated and prevented from turning when it is anchored in position. As is well indicated in Figure 6 of the drawings, the portion of the arbor bolt near the head is closely fitted to the walls 26 of the gear casing. This arrangement provides a firm support for the driving shaft 5 which is journaled within the central portion of each arbor bolt.

The lower end of the gear casing 1 is closed by a bushing 27, which forms a bearing for the end of the shaft 5. This bushing is secured to the casing by means of a key 28. The bushing 27 is also formed with a central lower extension 29 which is rotatively mounted in the support 30, which, in the complete cotton picker, is substantially circular in outline and carries a circular series of such picker bar assemblies as are here shown.

The upper end of the driving shaft 5 is formed with a thrust flange 31, splines 32 and a central axial lubricant passage 33 communicating with radial ducts 34, 35 and 36, which permit the passage of lubricant to the various bearings and gears of the assembly. At the extreme top of the driving shaft is preferably mounted a scraper 37 designed to gather lubricant from wicks as the picker bar assemblies are moved in their orbital paths.

The bearing for the upper end of the driving shaft 5 within the casing 1 is provided with a bushing 38 preferably screw threaded into the casing and having its lower end in engagement with the thrust flange 31. The upper end of this bushing is formed with spaced extensions 39 for facilitating the removal of the bushing and its adjustment for tightly mounting the driving shaft within the gear casing.

Owing to the strenuous service which cotton pickers of the present type are called upon to perform, it often happens that picker stems become bent, broken, or so engaged with the parts of the cotton plants that abnormal resistance to the rotation of the picker stems is encountered. In this event, it is desirable that the mechanism for rotating the picker stems be automatically releasable so as to prevent injury to the other parts of the mechanism. In the present case, such a result is obtained by reason of the releasable driving connection provided for the sprocket wheel 40 by means of which rotation is transmitted to the driving shaft 5.

In the arrangement shown the sprocket wheel 40 is not directly keyed to the driving shaft 5. It is frictionally engaged by clutch members 41 and 42, the lower clutch member 41 being preferably fixed against sliding movement on the driving shaft, and the upper clutch member 42 being pressed downwardly against the sprocket wheel by means of an expansion spring 43. This spring preferably abuts against a flanged collar 44, which is held against upward movement. The clutch members 41 and 42 are preferably keyed to the shaft 5 by means of the splines 32 and cooperating formations on the clutch members.

As indicated in Figure 5 of the drawings, the cam arm 2 is connected with the body of the gear casing by means of an upstanding arcuate portion 45, which is preferably curved on a radius somewhat greater than the radius of the sprocket 40 so as to prevent interference with the rotation of the sprocket. In practice, the driving shaft 5 is rotated by an endless sprocket chain engaging the sprocket 40. It is to prevent interference of the operation of that driving mechanism that the cam arm 2 is shaped as clearly indicated in Figures 1, 3 and 5 of the drawings. The upper end of the cam arm is provided with a cam roller 46 for engagement with a cam track (not shown) for accurately controlling the angles at which the picker stems operate in different parts of their orbital movement.

What is claimed is:

1. A picker bar assembly comprising, in combination, a substantially tubular unitary gear casing, a driving shaft extending through the casing and journaled therein at the ends of the casing, picker stems projecting radially of the casing and journaled therein, gearing connecting each picker stem with the driving shaft, a gear on the shaft outside of the casing for rotating the driving shaft, and a cam engaging arm integral with the casing and extending to a position eccentric to and above said gear.

2. In a cotton picker of the class described, a picker bar assembly comprising, in combination, a substantially tubular and unitary cast metal gear casing, a driving shaft journaled within the casing, picker stems arranged in a vertical series one above another and journaled in the casing, gearing connecting each picker stem with said driving shaft, bridge journals removable through a wall of the casing and extending at intervals through the casing or forming bearings for the driving shaft and for aligning the same within the casing, means on the driving shaft above the casing for rotating the shaft, and an arm integral with the casing and having a cam engaging end eccentric to the driving shaft.

3. In a cotton picker of the class described, a picker bar assembly comprising, in combination, a substantially tubular gear casing, rotary picker stems arranged in vertical series and having their inner ends journaled within said gear casing, a driving shaft extending longitudinally of said casing and journaled therein, a sprocket wheel for rotating said driving shaft, friction clutch members keyed to said driving shaft, and a spring for normally establishing driving connections between said clutch members and said sprocket wheel, the friction clutch members and spring allowing the sprocket wheel to rotate with respect to the driving shaft whenever unusual resistance is encountered by the picker stems.

4. In a cotton picker of the class described, a picker bar assembly comprising, in combination, a gear casing, a driving shaft rotatable within the casing, rotary picker stems projecting from the casing, a bearing for each picker stem supported by the casing, a driven gear having a key and groove connection with each picker stem and solely supported by the picker stem under normal operative conditions, and a driving gear for rotatively connecting each picker stem with the driving shaft, the driven gear being operatively positioned by the insertion of the picker stem within the casing.

5. In a cotton picker of the class described, a picker bar assembly comprising, in combination, a substantially tubular unitary gear casing, a driving shaft extending through the casing and journaled therein at the ends of the casing, picker stem projecting radially of the casing and journaled therein, driving gears formed at spaced intervals on the driving shaft, driven gears removably receiving the picker stems, a detachable bearing for the picker stems mounted in the casing, and projections of the casing having arcuate inner surfaces closely adjacent to the circumference of the driven gears so as to cooperate with the driving gears to hold the driven gears substantially in operative position when the picker stems are removed from the casing.

6. In a cotton picker of the class described, a picker bar assembly comprising, in combination, a gear casing, a driving shaft rotatable within the casing, and bridge journals extending transversely of the casing and forming bearings for the driving shaft, the casing being formed with pairs of opposed openings to receive said bridge journals which are removable through one of said openings, each bridge journal being formed with a head having extensions interlockingly engaging lugs upon one side of the casing.

7. In a cotton picker of the class described, a picker bar assembly comprising, in combination, a gear casing, a driving shaft rotatable within the casing, rotary picker stems projecting from the casing and arranged to be rotated by said driving shaft, spaced removable bushings for each picker stem, a driven gear located between said spaced bushings and keyed to the picker stem, and a driving gear formed on the driving shaft for each picker stem, the driven gear being made in the form of a gear ring and having opposed radial slots therein slidably receiving a key secured to the picker stem.

8. A cotton picker structure comprising, in combination, a gear casing, a drive shaft extending through the casing and journaled therein, driving gears located at spaced positions on the driving shaft and non-rotatively mounted thereon, means at one end of the shaft and outside of the casing for rotating the shaft, picker stems carried by the shaft and projecting therefrom, a driven gear within the casing for each picker stem, keying means carried by the picker stem and arranged to be slidable within each driven gear, means formed within a bore of the driven gear for slidably receiving the keying means for facilitating the non-rotative interlocking of the picker stems and the driven gear by the sliding of the picker stems through the gear, and a formation on the casing cooperating with each driving gear to hold the driven gear in substantially operative position when the picker stem is removed from the casing by sliding it through the driven gear, the driven gear being held by said formation and a driving gear against movement with the picker stem when the latter is removed from the casing.

9. A cotton picker structure comprising, in combination, a gear casing, a driven shaft extending through the casing and journaled therein, driving gears located at spaced positions on the driving shaft and non-rotatively mounted thereon, means at one end of the shaft and outside of the casing for rotating the shaft, picker stems carried by the shaft and projecting therefrom, a driven gear within the casing for each picker stem, a transverse pin carried by the picker stem and arranged to be slidable within each driven gear, opposed grooves formed within a bore of the driven gear for slidably receiving the pin for facilitating the non-rotative interlocking of the picker stems and the driven gear by the sliding of the picker stems through the gear, a pocket formed in the casing cooperating with each driving gear to hold the driven gear in substantially operative position when the picker stem is removed from the casing by sliding it through the driven gears, the driven gear being held by the walls of the pocket and a driving gear against movement with the picker stem when the latter is removed from the casing and being held thereby in such position that a picker stem may be reinserted without manual adjustment of the driven gear.

In testimony whereof we affix our signatures.

EDWARD A. JOHNSTON.
DAVID B. BAKER.
CLARENCE R. HAGEN.